United States Patent
Heine

(10) Patent No.: US 10,914,536 B2
(45) Date of Patent: Feb. 9, 2021

(54) HEAT EXCHANGER FOR A MOTOR VEHICLE

(71) Applicant: Mahle International GmbH, Stuttgart (DE)

(72) Inventor: Reinhard Heine, Leutenbach (DE)

(73) Assignee: Mahle International GmbH

( * ) Notice: Subject to any disclaimer, the term of this patent is extended or adjusted under 35 U.S.C. 154(b) by 0 days.

(21) Appl. No.: 15/948,711

(22) Filed: Apr. 9, 2018

(65) Prior Publication Data
US 2018/0292147 A1  Oct. 11, 2018

(30) Foreign Application Priority Data
Apr. 10, 2017  (DE) .................. 10 2017 206 113

(51) Int. Cl.
| F28F 9/007 | (2006.01) |
| F28F 9/013 | (2006.01) |
| F28D 1/053 | (2006.01) |
| F02B 29/04 | (2006.01) |
| F01P 3/18 | (2006.01) |
| F01P 3/20 | (2006.01) |
| F28F 19/00 | (2006.01) |
| F28F 9/02 | (2006.01) |
| F28D 21/00 | (2006.01) |

(52) U.S. Cl.
CPC .............. *F28F 9/0075* (2013.01); *F01P 3/18* (2013.01); *F01P 3/20* (2013.01); *F02B 29/0462* (2013.01); *F28D 1/05366* (2013.01); *F28F 19/00* (2013.01); *F01P 2060/02* (2013.01); *F28D 2021/0082* (2013.01); *F28F 9/0226* (2013.01); *F28F 2225/00* (2013.01); *F28F 2265/26* (2013.01)

(58) Field of Classification Search
CPC .... F28F 9/0131; F28F 2265/26; F28F 9/0075; F28F 2225/00
USPC ..................................................... 165/81, 149
See application file for complete search history.

(56) References Cited

U.S. PATENT DOCUMENTS

| 6,412,547 | B1 * | 7/2002 | Siler ....................... | F28F 9/001 165/149 |
| 7,198,095 | B2 * | 4/2007 | Nguyen .................. | F28F 9/001 165/149 |
| 7,621,317 | B2 * | 11/2009 | Rousseau ................ | F28F 9/001 165/149 |
| 7,721,791 | B2 * | 5/2010 | Hayasaka ............... | F28F 9/001 165/149 |
| 7,921,902 | B2 * | 4/2011 | Horoho ................... | F28F 9/001 165/149 |
| 9,243,849 | B2 * | 1/2016 | Saumweber ............ | F28D 9/005 |

(Continued)

FOREIGN PATENT DOCUMENTS

| DE | 20 2009 008 088 U1 | 8/2009 |
| DE | 11 2007 000 019 B4 | 12/2012 |

(Continued)

*Primary Examiner* — Leonard R Leo
(74) *Attorney, Agent, or Firm* — Fishman Stewart PLLC

(57) ABSTRACT

A heat exchanger may include a plurality of pipe bodies arranged between two side parts. At least one side part may have at least one predetermined breaking point and at least one heat expansion compensator. The at least one side part may include at least one aperture, which may lead from the at least one predetermined breaking point to the at least one heat expansion compensator.

12 Claims, 5 Drawing Sheets

(56) References Cited

U.S. PATENT DOCUMENTS

| | | |
|---|---|---|
| 10,359,238 B2 * | 7/2019 | Johnson .................. F28F 9/001 |
| 2005/0121178 A1 | 6/2005 | Nguyen |
| 2011/0024081 A1 | 2/2011 | Riondet et al. |
| 2016/0238325 A1 | 8/2016 | Johnson et al. |

FOREIGN PATENT DOCUMENTS

| | | | |
|---|---|---|---|
| EP | 1 502 068 B1 | 7/2009 | |
| FR | 2916836 A1 * | 12/2008 | .............. F28F 9/001 |
| FR | 3059403 A1 * | 6/2018 | .............. F28F 9/001 |
| GB | 2452785 A | 3/2009 | |
| GB | 2520968 A | 6/2015 | |
| GB | 2533426 A | 6/2016 | |

* cited by examiner

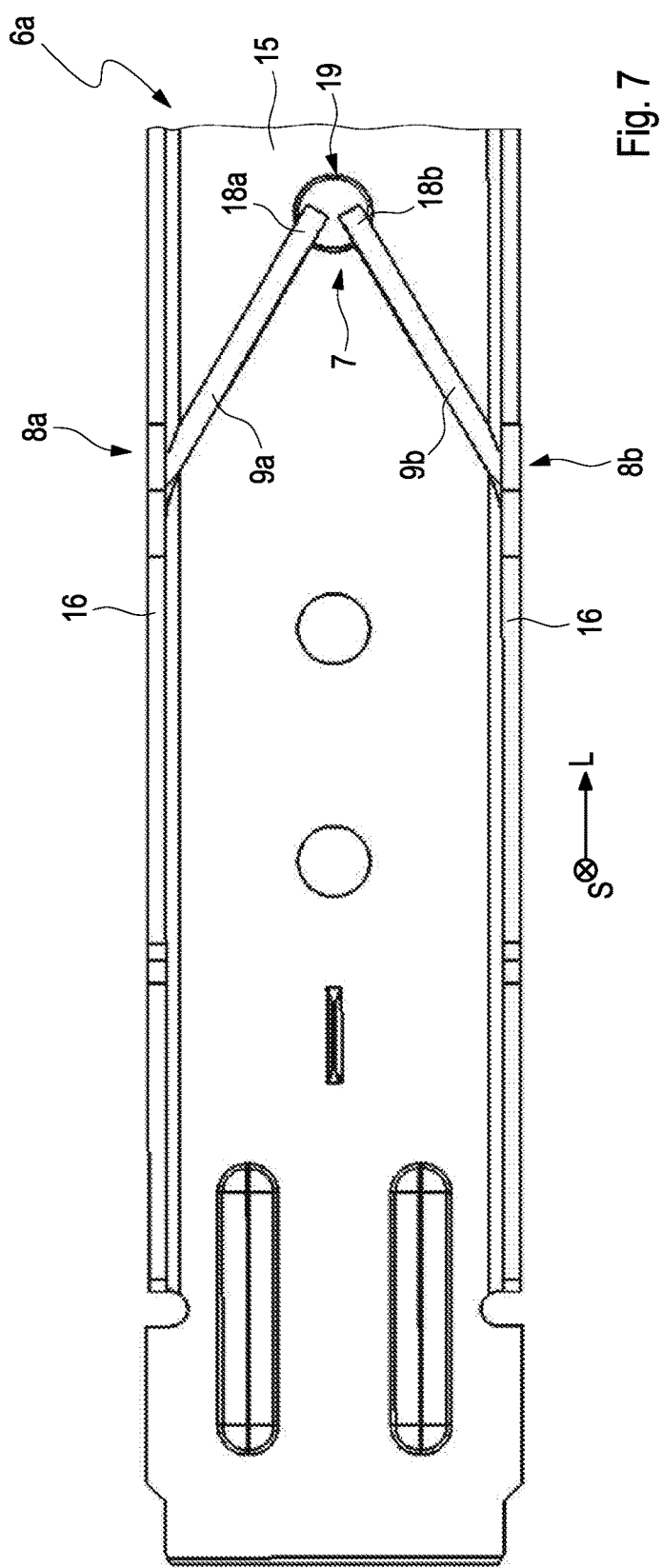
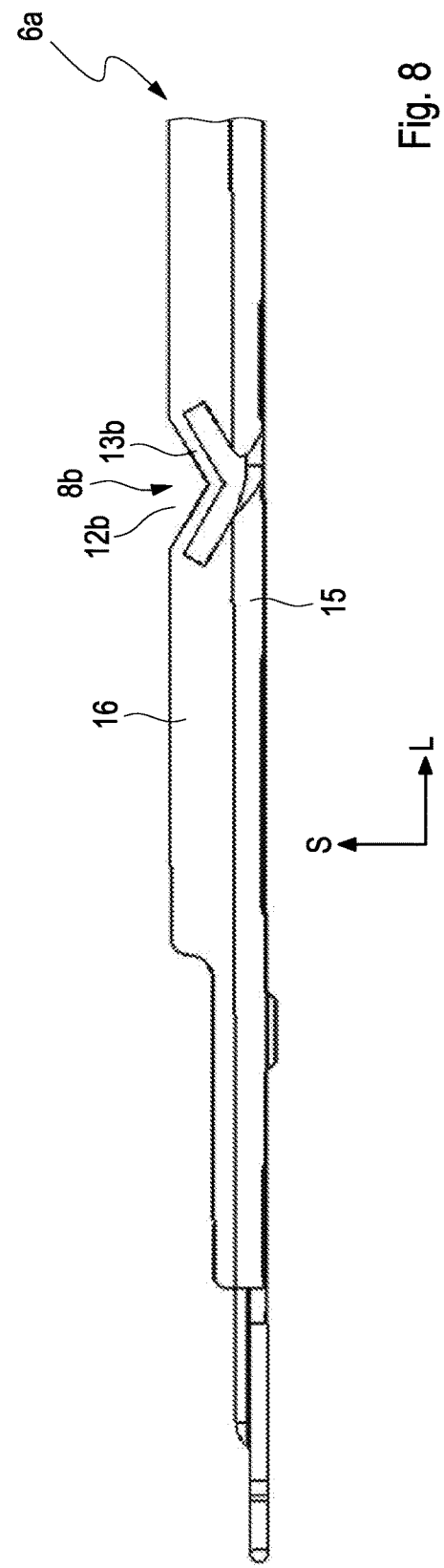

HEAT EXCHANGER FOR A MOTOR VEHICLE

CROSS-REFERENCE TO RELATED APPLICATIONS

This application claims priority to German Patent Application No. DE 10 2017 206 113.8, filed on Apr. 10, 2017, the contents of which are incorporated herein by reference in their entirety.

TECHNICAL FIELD

The invention relates to a heat exchanger for a motor vehicle as well as to a heat exchanger comprising such a heat exchanger.

BACKGROUND

Conventional heat exchangers, which are used as coolant coolers or intercoolers in a motor vehicle, typically comprise a plurality of pipe bodies, through which a coolant can flow. The pipe bodies are arranged on top of one another like a stack and are soldered to one or a plurality of bottoms in the course of the assembly of the heat exchanger and are secured relative to one another in this way. To facilitate the soldering process, said pipe bodies are oftentimes arranged between two side parts, which serve to laterally stabilize the pipe bodies during the soldering. Such side parts are typically made of a suitable light metal, such as aluminum, for example, and are embodied to be sufficiently stiff to ensure the desired stabilization of the pipe bodies. Said side parts are only required for the installation of the heat exchanger, but not during the operation of the heat exchanger, thus after the assembly of the heat exchanger. However, said side parts are typically designed in such a way that they can remain on the heat exchanger even after the assembly thereof. A laborious removal of the side parts from the heat exchanger is thus omitted. The side parts can furthermore be used for the mechanical stabilization of the bottoms or pipe bodies, respectively, after the assembly of the heat exchanger.

Due to the fact that the actual length of the individual pipe bodies can change along their longitudinal direction as a result of heat expansion effects during the operation of the heat exchanger, the side parts must not be designed with a stiffness, which is too high, because they can otherwise not follow said longitudinal expansion of the pipe bodies, so that there is the risk of a mechanical break of the pipe bodies, which typically have a thinner wall thickness than the side parts. It is thus known from conventional heat exchangers to provide said side parts with a predetermined breaking point, which ensures a controlled break of the side part.

Such a generic heat exchanger is described in EP 1 502 068 B1. The heat exchanger comprises a plurality of pipes and corrugates ribs, which are connected to one another in the manner of a net structure, as well as two side parts, which enclose the pipes and corrugated ribs on opposite sides. Provision is thereby made on one of the side parts for at least one predetermined breaking point, which is formed by webs. Said webs are thereby laterally limited by sections, of which at least one is embodied in an edged manner in the direction of the webs.

Die DE 2009 008 088 U1 deals with a heat exchanger comprising a block of pipe elements and rib elements. On at least one side surface, the block is equipped with a side part, which, in turn, has at least one heat expansion compensating device. Said heat expansion compensating device thereby has at least one recess comprising a first and a second section, which together form substantially a V-shape. Two further, second recesses are arranged on opposite sides with respect to a longitudinal axis of the side part and are in each case aligned substantially parallel to the first and the second section of the first recess.

It turns out to be disadvantageous in the case of conventional side parts that partial pieces of the side part can detach from the heat exchanger in the event of a break of the side part, caused by a thermally induced longitudinal expansion of the pipe bodies, and can thus cause damages or even destructions in the engine compartment of the respective motor vehicle.

SUMMARY

It is thus an object of the present invention to create a heat exchanger comprising at least one side part, in the case of which the risk of an uncontrolled break of the side part is largely or even eliminated completely.

This object is solved by means of the subject matter of the independent patent claims. Preferred embodiments are the subject matter of the dependent patent claims.

It is thus the basic idea of the invention to equip a side part for stabilizing a heat exchanger during the assembly with a predetermined breaking point as well as with at least one heat expansion compensator. The side part is provided with a certain elasticity along its longitudinal and transverse direction in a simple manner by means of the heat expansion compensator. In the case of thermally induced length variation of the pipe bodies during operation of the heat exchanger, this makes it possible to the side part to follow this longitudinal expansion at least across a certain distance, so that a mechanical break of the side part is prevented. If, due to very high temperature fluctuations of the pipe bodies, the elasticity, which can be attained by the heat expansion compensator, should not be sufficient to follow the longitudinal expansion of the pipe bodies, a controlled break of the side part is ensured by means of the predetermined breaking device, which is essential for the invention. An unwanted, uncontrolled detachment of a partial piece of the side part can be prevented in this way. An aperture, which leads from the predetermined breaking point to the at least one heat expansion compensator, is significant for the invention. It has become evident that, on the one hand, the required elasticity in longitudinal and transverse direction is provided to the side part by means of this aperture. On the other hand, the side part remains sufficiently stiff so as to be able to effect the desired stabilization of the pipe bodies.

As a result, a side part is created in this way, which, on the one hand, is able to follow the thermally induced longitudinal expansion of the pipe bodies across a relatively large distance. On the other hand, however, it is also ensured that, in the event of a break of the side part, which cannot be prevented, in particular if the elasticity provided by the heat expansion compensators should no longer be sufficient for the required longitudinal expansion of the side part, a controlled mechanical break of the side part occurs. An unwanted detachment of partial pieces of the side part and the associated risk of damages to further components of the motor vehicle, in which the heat exchanger is used, can be ruled out in all probability in this way.

A heat exchanger according to the invention comprises a plurality of pipe bodies, which are arranged between two side parts. At least one side part has at least one predetermined breaking point, preferably exactly one predetermined breaking point, and at least one heat expansion compensator.

Provision is made in the side part for at least one aperture, which leads from the predetermined breaking point to the at least one heat expansion compensator. Particularly preferably, both side parts are embodied as described above.

According to a preferred embodiment, the at least one side part has a first and a second heat expansion compensator as well as a first and a second aperture. In this embodiment, the two end sections of the two apertures, which face one another, and which are arranged at a distance to one another, form a part of the predetermined breaking point, which is significant for the invention. With the use of two heat expansion compensators, it is ensured that the side part has the elasticity, which is required in the longitudinal direction, across the entire width of the side part, thus transversely to the longitudinal direction.

According to a preferred embodiment, the wall thickness of the respective side part is reduced in the area between the two end sections. According to a further preferred embodiment, the predetermined breaking point has a predetermined breaking web. The wall thickness of the predetermined breaking web is preferably reduced. In both embodiments, it is ensured in this way that the predetermined breaking point breaks in due time, so that an unwanted mechanical break can be avoided at a different, unwanted location in the side part. In an advantageous further development, the at least one side part has a first and a second heat expansion compensator as well as a first and a second aperture. In this further development, the first aperture leads from the predetermined breaking point to the first heat expansion compensator and the second aperture leads from the predetermined breaking point to the second heat expansion compensator. In this development, the predetermined breaking web is partly enclosed by the first and second aperture and by a third aperture, which is arranged at a distance to these two apertures. The proper function of the predetermined breaking point is ensured by means of such an embodiment.

Advantageously, the at least one side part is embodied longitudinally and has, in a longitudinal side, a recess, which, as part of the at least one heat expansion compensator, divides said longitudinal side into a first and a second side section. A connecting web, which connects the first side section to the second side section of the longitudinal side, is furthermore arranged in the recess. Said connecting web provides elastic properties to the heat expansion compensator, so that the side part can follow the thermally induced longitudinal expansion of the pipe bodies at least across a certain distance.

Particularly advantageously, the at least one aperture leads into the recess, which is assigned to it. With respect to the longitudinal direction of the side part, said aperture forms a gap in the longitudinal direction of the side part in this way, so that said side part is divided into two partial sections along the longitudinal direction. Both partial sections are thus mechanically connected to one another only by means of the heat expansion compensator as well as by means of the predetermined breaking point. The desired elasticity of the side part in the longitudinal direction is ensured in this way on the one hand, but the proper function of the predetermined breaking point is ensured as well on the other hand.

At least one recess is in each case arranged in a particularly advantageous manner at the same height in the two opposite longitudinal sides of the longitudinal-shaped side part with respect to a longitudinal direction, which is defined by the longitudinal side.

In an advantageous further development, two recesses are arranged at a distance to one another in each longitudinal side. The elasticity of the side part can be improved in the longitudinal direction in this way, so that the side part is able to follow a longitudinal expansion of the pipe bodies across a distance, which is enlarged with respect to a side part with only a single expansion.

According to another preferred embodiment, the at least one side part is embodied in a plate-like manner. In this embodiment, the predetermined breaking point is arranged substantially in the center between two opposite longitudinal sides of the plate-like side part.

In a further advantageous further development, the recess has a triangular geometry and the connecting web has a V-shaped geometry—in the top view onto the side part along the stacking direction of the pipe body. The tip of the "V" thereby points inwards, thus towards the side part. In this further development, the V-shaped connecting web is arranged in the corresponding recess in such a way that, in the top view onto the side part, two passage slits, which are arranged in a V-shaped manner, are formed in the recess, which extend the slit-like aperture laterally to the outside, thus towards the longitudinal side of the side part. Such a variation ensures a particularly high thermal elasticity of the connecting webs, without a loss of mechanical stiffness, which is too high, being associated therewith.

Advantageously, the first heat expansion compensator is arranged in a first longitudinal side of the side part and the second heat expansion compensator in a second longitudinal side of the side part located opposite the first longitudinal side. It is ensured in this way that the side part has the same elasticity on both longitudinal sides along the longitudinal direction.

Advantageously, at least one aperture is embodied in a slit-like manner. This preferably applies for all of the apertures, which lead from the predetermine breaking point to a respective heat expansion compensator. If present, this also applies for the third aperture in a particularly preferable manner.

The first and the second aperture, which are in each case embodied in a slit-like manner, can be arranged at an acute or at an obtuse intermediate angle to one another in a particularly advantageous manner. Experimental analyses have shown that the side part is equipped with particularly good elastic properties, while simultaneously having a high mechanical stability, by means of such a geometry.

In an advantageous further development, the third aperture extends transversely, preferably orthogonally, to the longitudinal side of the side part. Particularly preferably, the third aperture in each case forms an acute intermediate angle with the first and with the second aperture. Such a geometry also ensures that the side part is equipped with particularly good elastic properties while simultaneously having a high mechanical stability.

In another advantageous further development, the side part, which is embodied in a plate-like manner, has a plate bottom, which, towards the longitudinal sides, in each case transitions into a plate collar, which protrudes at an angle, preferably at a right angle, from the plate bottom. In this further development, the predetermined breaking point is arranged in the plate bottom and the at least one heat expansion compensator is at least partially arranged in the plate collar.

According to another preferred embodiment, the first and the second heat expansion compensator form a heat expansion compensating device with the two apertures and the predetermined breaking point. In this embodiment, provision is made for two heat expansion compensating devices, which are arranged in the at least one side part along the longitudinal direction at a distance to one another, preferably symmetrically to one another. The two heat expansion compensating devices can preferably be arranged symmetrically to one another. An arrangement of the two heat expansion compensating devices axially symmetrically with respect to the longitudinal direction of the respective side part is particularly preferred. The effect according to the invention of the heat expansion compensator, which is essential for the invention, can be intensified by using not only one, but two heat expansion compensating devices, in combination with the predetermined breaking point.

The invention further relates to a motor vehicle comprising an internal combustion engine and comprising a fresh air system, which cooperates with the internal combustion engine and which comprises an above-introduced heat exchanger, which is embodied as intercooler. In the alternative or in addition, the motor vehicle comprises a cooling circuit, which cooperates with the internal combustion engine and which comprises an above-introduced heat exchanger, which is embodied as coolant cooler. The above-described advantages of the heat exchanger can thus also be transferred to the motor vehicle according to the invention. A use of the above-introduced side part in an electric or hybrid vehicle is also conceivable.

Further important features and advantages of the invention follow from the subclaims, from the drawings, and from the corresponding figure description by means of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the description below.

BRIEF DESCRIPTION OF THE DRAWINGS

In each case schematically,

FIG. 7 shows a variation of the first side part of FIGS. 2 and 3 in a top view, FIG. 8 shows a side view of the side part of FIG. 7.

DETAILED DESCRIPTION

Figure 1:
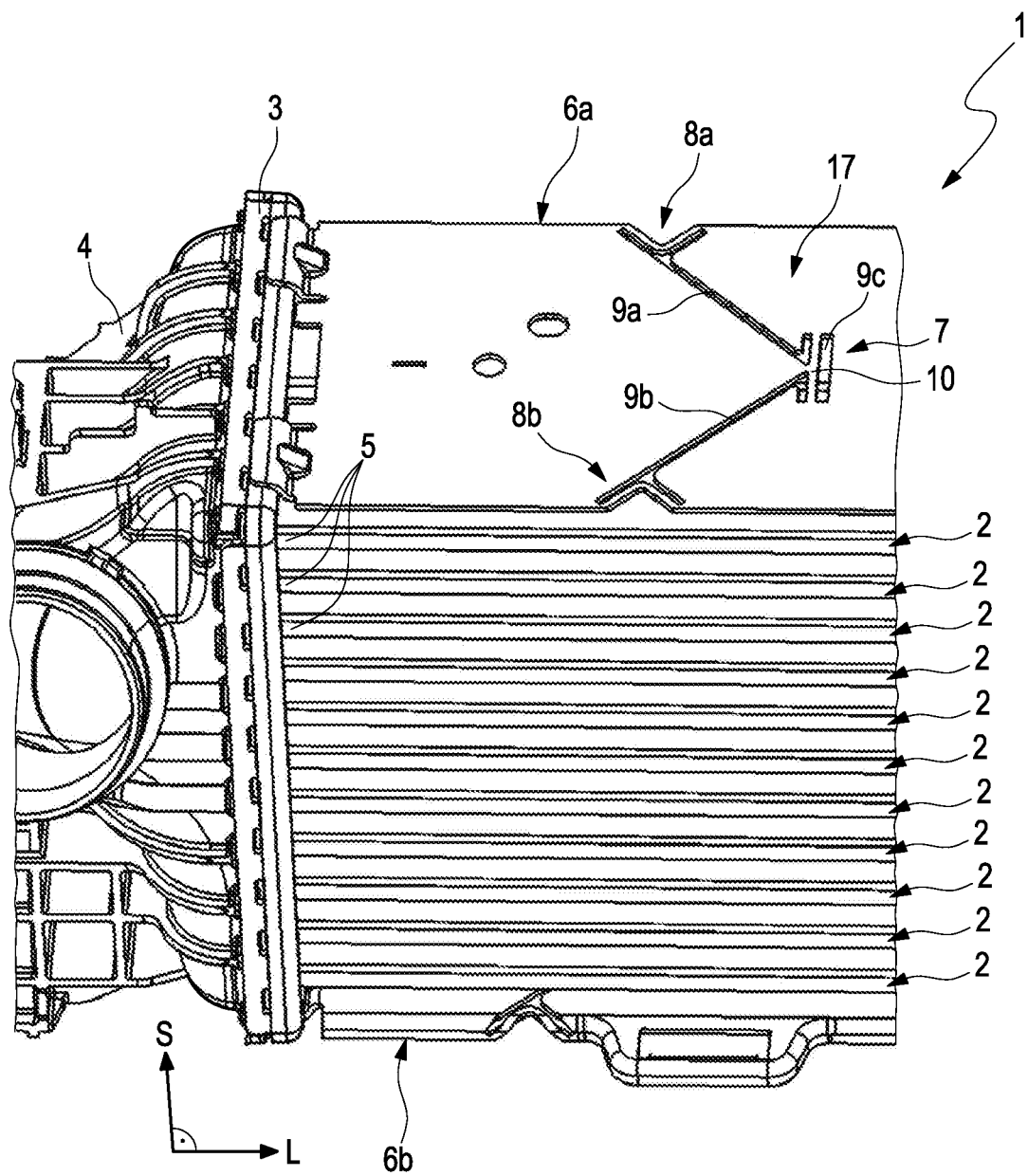
FIG. 1 shows an example of a heat exchanger according to the invention comprising pipe bodies, which are arranged between a first and a second side part, in a perspective partial illustration.

In a perspective partial illustration, FIG. 1 illustrates an example of a heat exchanger 1 according to the invention, which is embodied as intercooler in the example of FIG. 1. The heat exchanger 1 comprises a plurality of pipe bodies 2, which are stacked on top of one another along a stacking direction S and through which a coolant (not shown) can flow. The heat exchanger 1 further comprises a bottom 3, to which the pipe bodies 2 are soldered with their longitudinal ends 5 in the assembled state of the heat exchanger shown in FIG. 1. A coolant distributor 4 is also attached to the bottom 3, via which the coolant can be distributed to the individual pipe bodies 2. On a longitudinal end of the pipe bodies 2, which is located opposite the coolant distributor 4, provision can analogously be made for a further bottom (not shown), to which a coolant collector is attached in an analogous manner (also not shown). The coolant distributor 4 and the non-illustrated coolant collector can be crimped to the respective bottom 3.

As can further be seen in FIG. 1, the pipe bodies 2 are arranged between two side parts 6a, 6b. The two side parts 6a, 6b facilitate the soldering of the pipe bodies 2 to the two bottoms 3 in the course of the assembly of the heat exchanger 1, because they hold the group of the two bottoms 3 (only a single such bottom is shown in the partial illustration of FIG. 1) and the pipe bodies 2, which are arranged between the two bottoms 3, in the desired position during the soldering process. After the soldering, the two side parts 6a, 6b are no longer required and can be removed from the heat exchanger 1 again, but, for the sake of simplicity, frequently remain on the heat exchanger 1 after conclusion of the installation.

Figure 2:
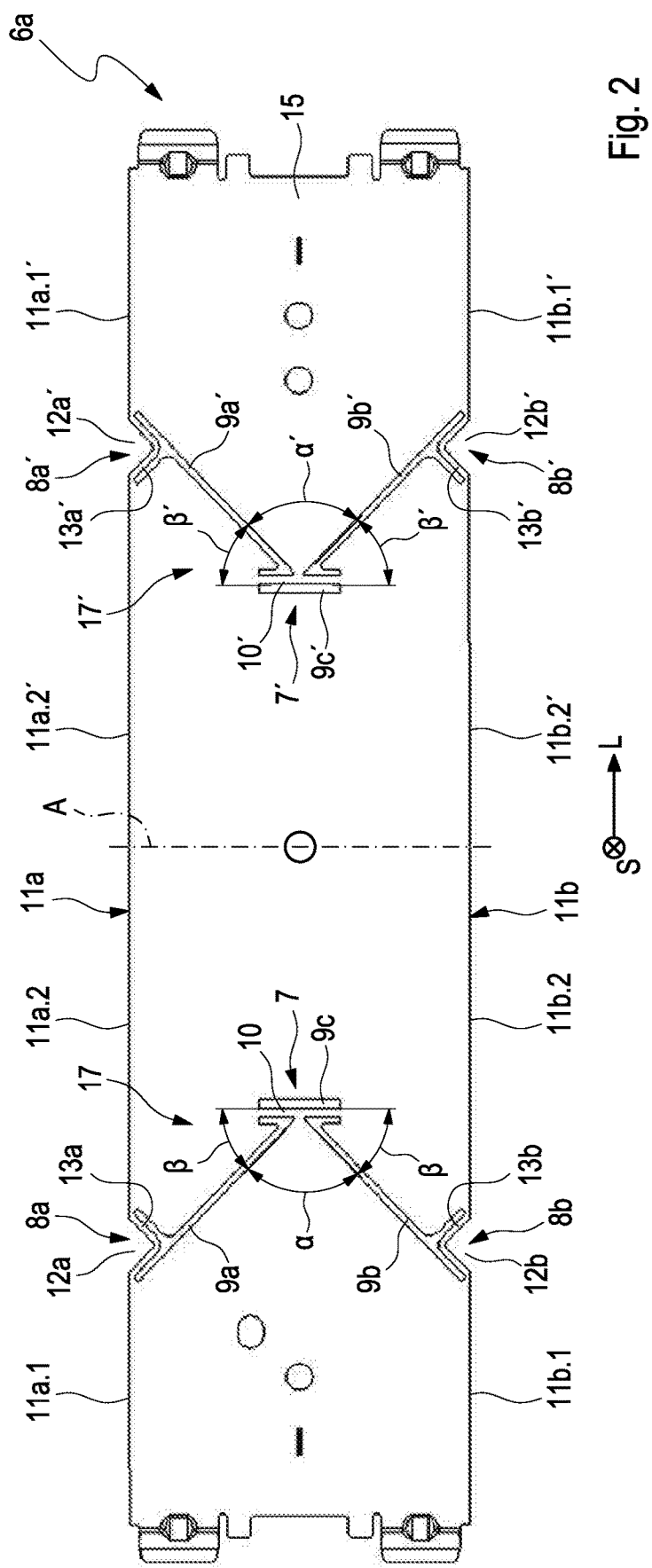
FIG. 2 shows a top view onto the first side part.

FIG. 2 shows the first side part 6a in a top view along the stacking direction S in an exemplary manner. According to FIG. 2, the first side part 6a is embodied in a longitudinally-shaped manner and extends along a longitudinal direction L, which runs perpendicular to the stacking direction S. According to FIG. 2, the side part 6a has a predetermined breaking point 7. The predetermined breaking point 7 comprises a predetermined breaking web 10. Compared to the wall thickness of the areas of the side part 6a, which are complementary to the predetermined breaking web 10, the wall thickness of the predetermined breaking web 10 can be reduced, which cannot be gathered directly from the top view of FIG. 1. In the example of the figures, the predetermined breaking point 7 is arranged substantially in the middle between the two opposite longitudinal sides 11a, 11b of the first side part 6a.

The first side part 6a further has a first and a second heat expansion compensator 8a, 8b as well as a first and a second aperture 9a, 9b. The two apertures 9a, 9b are thereby preferably embodied in a slit-like manner. As clearly illustrated in FIG. 2, the first aperture 9a leads from the predetermined breaking point 7 to the first heat expansion compensator 8a. Analogously, the second aperture 9b leads from the predetermined breaking point 7 to the second heat expansion compensator 8b. According to FIG. 2, the predetermined breaking web 10 is furthermore partially enclosed by the first and second aperture 9a, 9b as well as by a further third aperture 9c, which is arranged at a distance to said two apertures 9a, 9b. The third aperture 9c can also be embodied in a slit-like manner. The predetermined breaking point 7 thus encompasses the predetermined breaking web 10 as well as the three apertures 9a, 9b and 9c.

Figure 3:
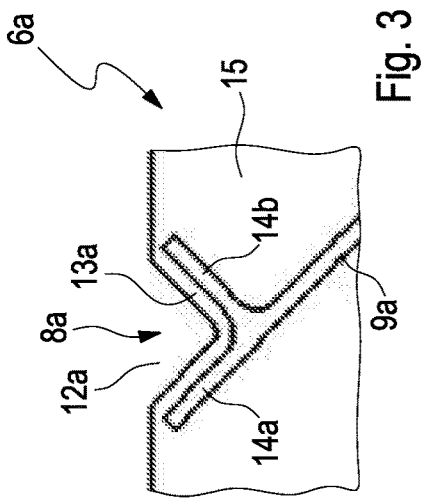
FIG. 3 shows a detailed illustration of the side part of FIG. 2 in the area of a heat expansion compensator.

According to FIG. 2, the side part 6a is embodied in a substantially plate-like manner and longitudinally-shaped with two opposite longitudinal sides 11a, 11b. In the first longitudinal side 11a, a first recess 12a is present, which is part of the first heat expansion compensator 8a and which divides the first longitudinal side 11a into a first and a second side section 11a.1, 11a.2. In the first recess 12a, a first connecting web 13a is arranged, which connects the first side section 11a.1 to the second side section 11a.2 of the first longitudinal side 11a. For clarification purposes, FIG. 3 shows the first side part 6a in a detailed illustration in the area of the first recess 12a. Analogously to the first recess 12a, which is provided in the first longitudinal side 11a, a second recess 12b, which is part of the second heat expansion compensator 8b and which divides the second longitudinal side 11b into a first and a second side section 11b.1, 11b.2, is present in the second longitudinal side 11b. In the second recess 12b, a second connecting web 13b is arranged, which connects the first side section 11b.1 to the second side section 11b.2 of the second longitudinal side 11b. With respect to the longitudinal direction L, the two recesses 12a, 12b of the heat expansion compensators 8a, 8b are arranged at the same height.

As can be gathered from the illustrations of FIGS. 2 and 3, the two recesses 12a, 12b in each case have a triangular geometry in the top view onto the side part 6a. The two connecting webs 13a, 13b in each case have a V-shaped geometry, wherein the tip of the "V" points inwards, towards the side part 6a. The two V-shaped connecting webs 13a, 13b are arranged in the respective recess 12a, 12b in such a way that two passage slits 14a, 14b, which are arranged in a V-shaped manner and which extend the slit-like aperture towards the longitudinal side of the side part, are formed in the recess 12a, 12b in the top view onto the side part 6a.

As shown in the example of FIG. 2, the first slit-like aperture 9a and the second sit-like aperture 9b can be arranged at an obtuse intermediate angle α relative to one another. In variations thereto, an acute or right intermediate angle α is conceivable as well. The third slit-like aperture 9c can extend transversely, preferably orthogonally to the longitudinal sides 11a, 11b of the first side part 6a—as shown in FIG. 2—and thus also orthogonally to the longitudinal direction L. The third slit-like aperture 9c preferably in each case forms an acute intermediate angle β with the first and the second aperture 9a, 9b.

Figure 4:
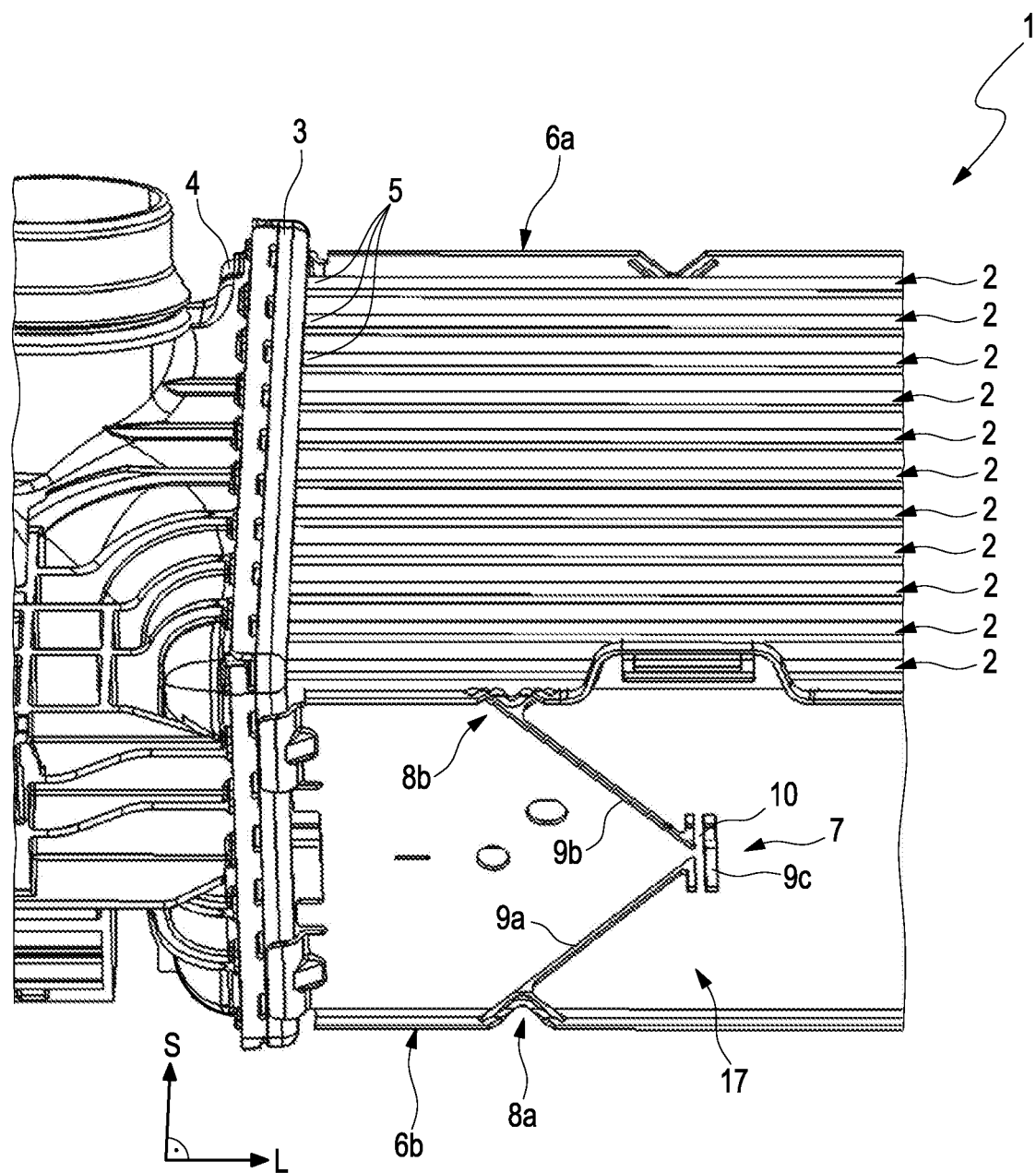
FIG. 4 shows the heat exchanger of FIG. 1 from another viewing angle.
Figure 5:
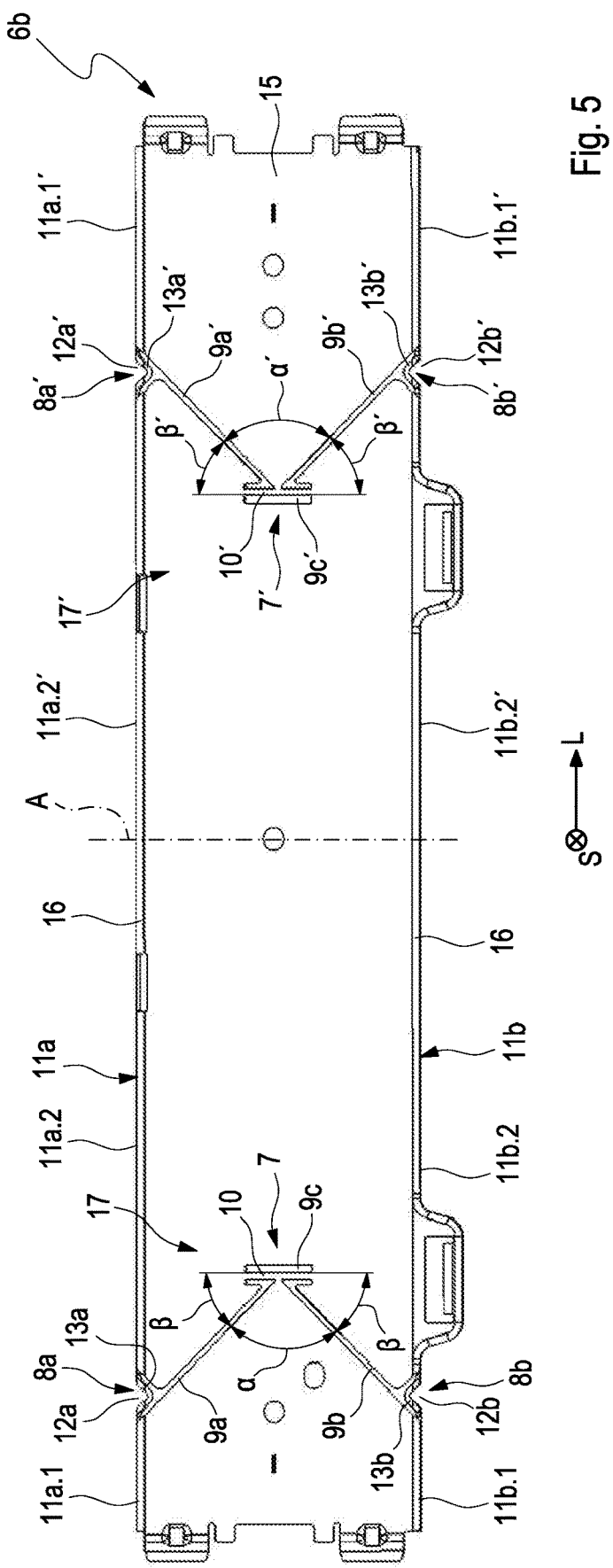
FIG. 5 shows a top view onto the second side part.
Figure 6:
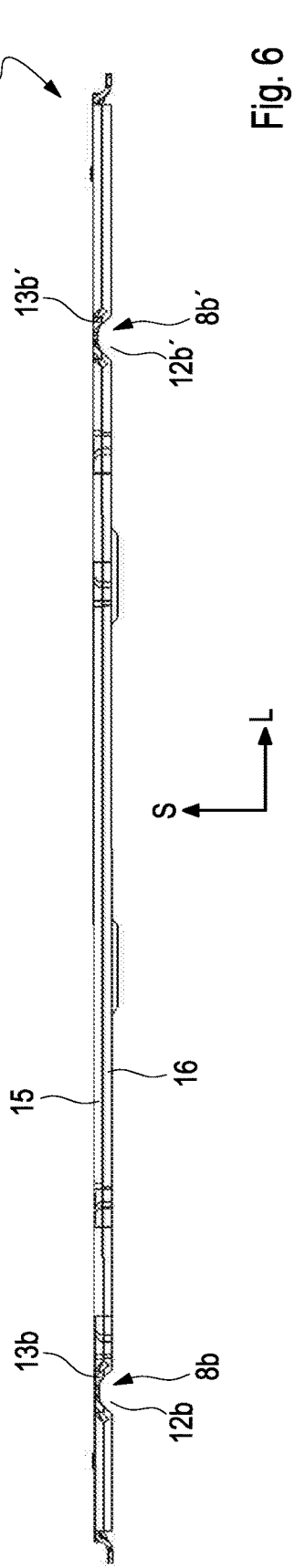
FIG. 6 shows a side view of the second side part.

FIG. 4 shows the heat exchanger 1 of FIG. 1 from another viewing angle, in which the second side part 6b can be seen in the front. FIG. 5 shows the second side part 6b analogously to FIG. 2 in a top view along the stacking direction S. As can be seen in FIGS. 2 and 5, the second side part 6b differs from the first part 6a by a plate collar 16, which protrudes at an angle from a plate bottom 15 of the second side part 6b. Such a plate collar 16 is not present in the first side part 6a, i.e. the first side part 6a is embodied in a substantially flat manner. As illustrated in FIG. 6, which shows the second side part 6b in a side view, the plate collar 16 can protrude at a right angle from the plate bottom 15. It can furthermore be gathered from the side view of FIG. 6 that the heat expansion compensators 8a, 8b are arranged in the plate collar 16 with the recesses 12a, 12b and the connecting webs 13a, 13b. The predetermined breaking point 7, in contrast, is arranged completely in the plate bottom 15.

Attention shall be turned below to the illustrations of FIGS. 2 and 5. According to this, the first and second heat expansion compensator 8a, 8b comprising the two apertures 9a, 9b and the predetermined breaking point 7 thus form a heat expansion compensating device 17. Provision is made in the first side part 6a according to FIG. 2 as well as in the second side part 6b according to FIG. 5 for two such heat expansion compensating devices 17, 17' and they are arranged at a distance to one another along the longitudinal direction L. The two heat expansion compensating devices 17, 17' can preferably be arranged axially symmetrically to one another with respect to an axis of symmetry A. which extends perpendicular to the longitudinal direction L.

FIGS. 7 and 8 show a variation of the side parts 6a, 6b, as it can preferably be used in a coolant cooler. To avoid unnecessary text repetitions, only the first side part 6a is shown in FIGS. 7 and 8 in an exemplary manner. Analogously to the figures of FIG. 2, FIG. 7 thereby shows the first side part 6a in a top view along the stacking direction S, and analogously to FIG. 4, FIG. 8 shows the first side part 6 in a side view. In the case of the variation according to FIGS. 7 and 8, the first side part 6a also comprises a first and a second heat expansion compensator 8a, 8b as well as a first and a second aperture 9a, 9b. The two end sections 18a, 18b of the two apertures 9a, 9b, which face one another, and which are arranged at a distance to one another, thereby form a part of the predetermined breaking point 7. The wall thickness of the plate bottom 15 of the first side part 6a is reduced with respect to the complementary areas in an area 19 between the two end sections 18a, 18b, which is also part of the predetermined breaking point 7. In the example of FIG. 7, said area 19, into which the two end sections 18a, 18b of the two slit-like apertures 9a, 9b lead as well, has the geometry of a circle in the top view.

The invention claimed is:

1. A heat exchanger, comprising:
a plurality of pipe bodies arranged between two side parts;
wherein at least one side part has at least one predetermined breaking point and at least one heat expansion compensator, and wherein the at least one side part includes at least one aperture, which leads from the at least one predetermined breaking point to the at least one heat expansion compensator;
wherein the at least one aperture includes a first aperture and a second aperture arranged at a distance from one another, and the at least one predetermined breaking point includes a predetermined breaking web partly enclosed by the first aperture, the second aperture, and a third aperture arranged at a distance from the first aperture and the second aperture; and
wherein the third aperture extends transversely to a longitudinal side of the at least one side part and forms an acute intermediate angle with the first and the second apertures.

2. The heat exchanger according to claim 1, wherein:
the at least one heat expansion compensator includes a first heat expansion compensator and a second heat expansion compensator; and
the first aperture leads from the at least one predetermined breaking point to the first heat expansion compensator, and the second aperture leads from the at least one predetermined breaking point to the second heat expansion compensator.

3. The heat exchanger according to claim 1, wherein:
the at least one side part has, in a longitudinal side, at least one recess, which is part of the at least one heat expansion compensator and divides the longitudinal side into a first and a second side section; and
at least one connecting web, which connects the first side section to the second side section, is arranged in the at least one recess.

4. The heat exchanger according to claim 3, wherein the at least one aperture leads into the at least one recess.

5. The heat exchanger according to claim 3, wherein:
the at least one recess has a triangular geometry, and the at least one connecting web has a V-shaped geometry having a tip that points inwards towards the at least one side part; and
the at least one connecting web is arranged in the at least one recess in such a way that, in a top view onto the at least one side part, two passage slits, which are arranged therein in a V-shaped manner, are formed and extend the at least one aperture towards the longitudinal side of the at least one side part.

6. The heat exchanger according to claim 1, wherein:
the at least one side part has two opposite longitudinal sides each having at least one recess; and
wherein each recess is arranged at a same distance of the at least one side part with respect to a longitudinal direction, which is defined by the respective longitudinal side.

7. The heat exchanger according to claim 1, wherein the at least one side part includes two recesses arranged at a distance to one another in each of two opposing longitudinal sides of the at least one side part.

8. The heat exchanger according to claim 1, wherein:
the at least one side part is embodied in a plate-like manner; and
the at least one predetermined breaking point is arranged substantially in the middle between two opposite longitudinal sides of the at least one side part.

9. The heat exchanger according to claim 1, wherein the at least one aperture is embodied in a slit-like manner.

10. The heat exchanger according to claim 1, wherein the first aperture and the second aperture are each embodied in a slit-like manner, and are arranged at one of an acute intermediate angle or an obtuse intermediate angle to one another.

11. The heat exchanger according to claim 1, wherein:
the at least one side part, which is embodied in a plate-like manner, has a plate bottom, which, towards opposing longitudinal sides of the at least one side part, in each case transitions into a plate collar, which protrudes at an angle from the plate bottom; and
the at least one predetermined breaking point is arranged in the plate bottom, and the at least one heat expansion compensator is at least partially arranged in the plate collar.

12. A heat exchanger, comprising:
a plurality of pipe bodies arranged between two side parts;
wherein at least one side part has at least one predetermined breaking point and at least one heat expansion compensator, and wherein the at least one side part includes at least one aperture, which leads from the at least one predetermined breaking point to the at least one heat expansion compensator;
wherein the at least one aperture includes a first aperture and a second aperture arranged at a distance from one another, and the at least one predetermined breaking point includes a predetermined breaking web partly enclosed by the first aperture, the second aperture, and a third aperture arranged at a distance from the first aperture and the second aperture;
wherein the at least one side part has, in a longitudinal side, at least one recess, which is part of the at least one heat expansion compensator and divides the longitudinal side into a first and a second side section;
wherein at least one connecting web, which connects the first side section to the second side section, is arranged in the at least one recess;
wherein the at least one recess has a triangular geometry, and the at least one connecting web has a V-shaped geometry having a tip that points inwards towards the at least one side part; and
wherein the at least one connecting web is arranged in the at least one recess in such a way that, in a top view onto the at least one side part, two passage slits, which are arranged therein in a V-shaped manner, are formed and extend the at least one aperture towards the longitudinal side of the at least one side part.

* * * * *